(12) United States Patent
Schultz et al.

(10) Patent No.: US 10,801,709 B1
(45) Date of Patent: Oct. 13, 2020

(54) INTERLOCKING JOINER BRACKET AND SYSTEM FOR ADJOINING LIGHT FIXTURE SECTIONS

(71) Applicant: Focal Point, LLC, Chicago, IL (US)

(72) Inventors: Alec J. Schultz, Chicago, IL (US); Megan A. Donnelly, Darien, IL (US); Paul O. Ocampo, Chicago, IL (US)

(73) Assignee: Focal Point, LLC, Chicago, IL (US)

( * ) Notice: Subject to any disclaimer, the term of this patent is extended or adjusted under 35 U.S.C. 154(b) by 0 days.

(21) Appl. No.: 16/562,310

(22) Filed: Sep. 5, 2019

(51) Int. Cl.
*F21V 15/01* (2006.01)
*F21V 21/36* (2006.01)
*F16M 13/02* (2006.01)

(52) U.S. Cl.
CPC ............. *F21V 21/36* (2013.01); *F16M 13/02* (2013.01)

(58) Field of Classification Search
None
See application file for complete search history.

(56) References Cited

U.S. PATENT DOCUMENTS

| | | | | |
|---|---|---|---|---|
| 3,718,816 | A * | 2/1973 | Seelbach | F21V 21/35 362/394 |
| 2011/0080746 | A1 * | 4/2011 | Patti | F21S 8/026 362/370 |
| 2015/0226384 | A1 * | 8/2015 | Park | F21V 21/34 362/223 |
| 2018/0031217 | A1 * | 2/2018 | Tuchler | F21V 21/35 |

* cited by examiner

*Primary Examiner* — Elmito Breval
(74) *Attorney, Agent, or Firm* — Greenberg Traurig, LLP

(57) ABSTRACT

An example joiner bracket system for joining a first section and a second section of a fixture includes a pair of oppositely-oriented joiner brackets that have interlocking and complementary shapes. The joiner brackets may include features that engage with or attach to corresponding elements within the first and second fixtures. After the joiner brackets are secured to their respective fixture sections, the pair of joiner brackets may be positioned near each other to align a pair of bore holes or coupling bosses each extending at an angle through the pair of joiner brackets. Screws or other suitable fasteners may be driven through the aligned bosses or bores to couple to the bosses, and upon further engagement, to pull together the joiner brackets together and, in turn, bring together the first and second sections of the lighting fixture.

17 Claims, 12 Drawing Sheets

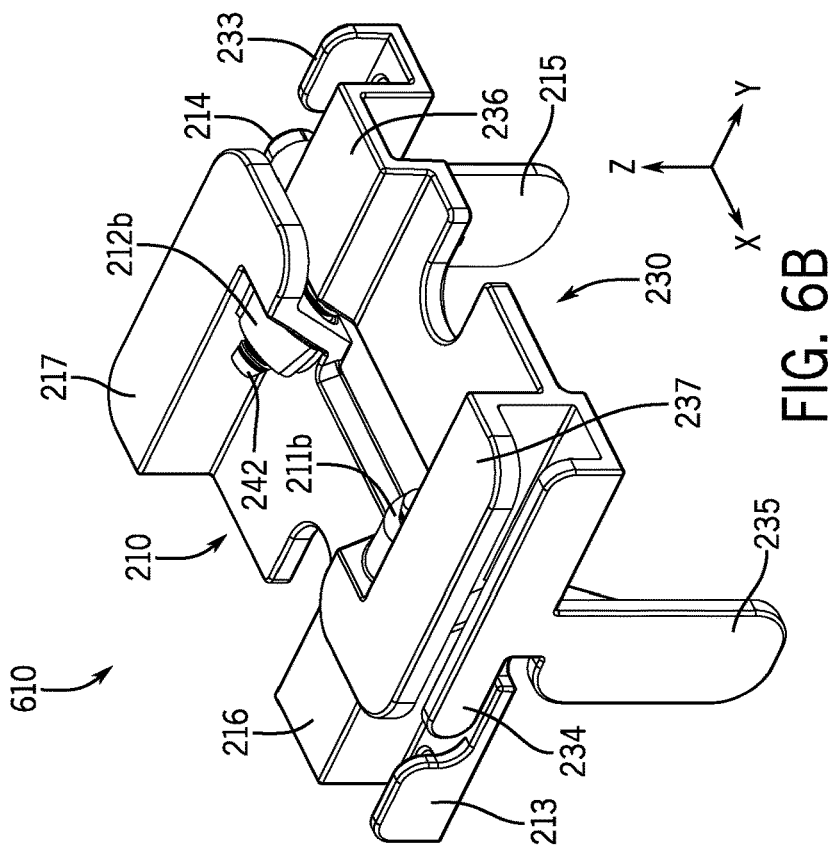
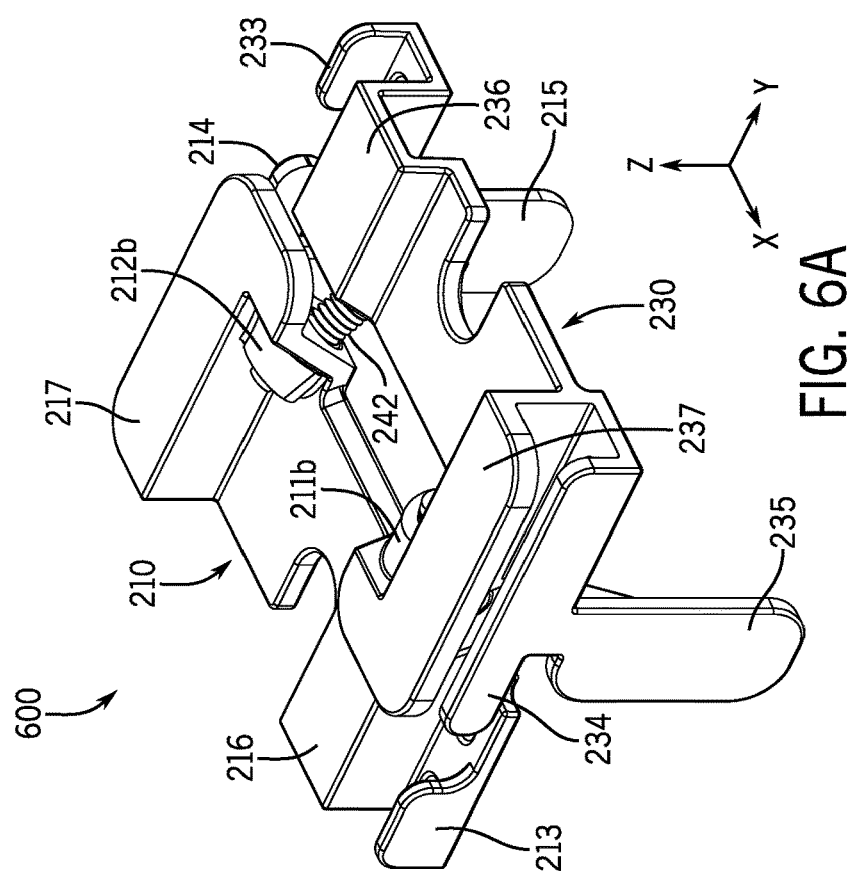
FIG. 6A
FIG. 6B

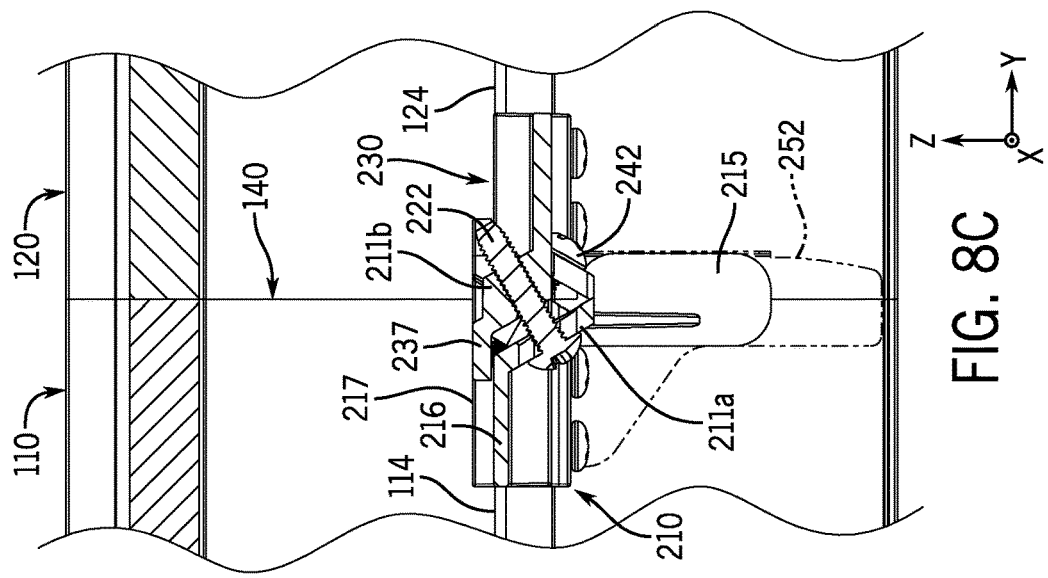
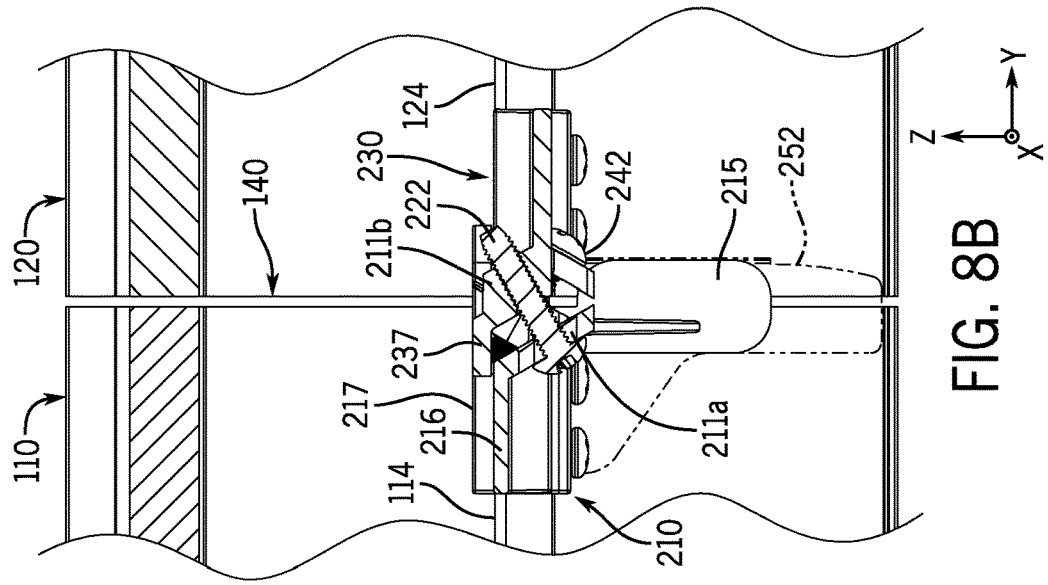
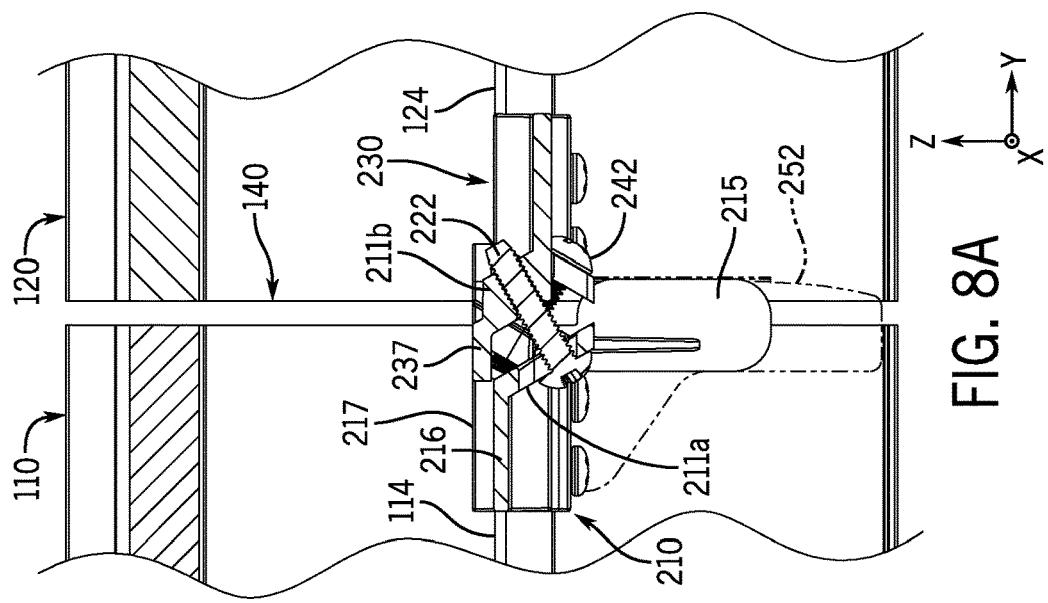

INTERLOCKING JOINER BRACKET AND SYSTEM FOR ADJOINING LIGHT FIXTURE SECTIONS

FIELD OF THE INVENTION

The present invention generally relates to joiner brackets, and more specifically to a system of joiner brackets that are used to join together sections of a light fixture using a cross-screw or other fastening arrangement.

BACKGROUND OF THE INVENTION

Traditionally, many lighting systems have been sold as ready-made or pre-configured systems. In some cases, lighting systems are delivered as parts to be assembled. In such cases, a user or technician may be tasked with following a series of steps to assemble the light fixture, and to subsequently hang, mount, or otherwise place the light fixture into a desired position within a room or space. For large lighting systems—such as lighting systems in large rooms and/or in commercial settings—the assembly and installation process presents many challenges. Joining two or more independent fixture sections together to seamlessly create a simple, larger fixture can be difficult. If the lighting system is first assembled on the ground, then a user or technician must devise a way to lift and place a large and heavy lighting system into position. For wall-mounted, ceiling-mounted, or pendant lighting systems, assembling a large and heavy light fixture on the ground may be infeasible. Moreover, construction sites may not have a sufficient amount of floor space to enable a user or technician to carry out an initial ground-based assembly in the first place.

In other cases, a lighting system may be configured for assembly while suspended or mounted. For example, multiple sections of a lighting system may be independently suspended from a ceiling, and subsequently brought together to form a substantially continuous light fixture. With each section being of a manageable size and weight so as to be handled by one or only a few technicians, such an installation process may be carried out without the need for machinery or other assistance to lift a heavy and cumbersome pre-assembled light fixture into position.

While suspended, piece-part assembly of a light fixture can beneficially be performed without the need for substantial machinery or lift assistance, there remains a few drawbacks. The process of joining adjacent sections of a light fixture often involves a technician on a ladder or scaffold articulating the opposing sections, and securing the two together—typically using one or more fasteners. This process can be risky to a technician, as it may be difficult to hold together adjacent sections while simultaneously locating and engaging the fasteners. It is therefore an object of the present invention to provide a joining system that is safe, accessible and easier to operate by a single technician.

In addition, light fixtures that are assembled from multiple sections may be more susceptible to aesthetic flaws, such as light leakage through gaps at the intersection of adjoining light fixture sections. It is therefore another object of the present invention to provide a joining system that mitigates potential light leakage gaps at the locations where adjacent fixture sections meet.

Furthermore, many existing joining systems for multiple-piece light fixtures include multiple unique components that complement each other and enable the joining of the light fixture sections. However, the design and manufacture of multiple unique components can serve to increase the cost and effort for joining the system, and thereby increase the cost of the light fixture assembly itself. It is therefore another object of the present invention to provide a joining system that can be manufactured at a reduced cost, without sacrificing the efficiency and effectiveness of the joining system.

Traditionally, fixture joining systems have been difficult to access, and often require the removal (and/or subsequent installation of) elements of a light fixture assembly, such as lenses, reflectors, or other parts. As a result, light fixture assemblies that use such joining systems may require a technician to perform some disassembly and reassembly of pre-assembled fixture sections, or may prevent a manufacturer from pre-assembling sections of a light fixture that would otherwise reduce the time involved to install the light fixture. In either case, the installation of a light fixture assembly may take more time and/or be more complicated than is desired. It is therefore yet another object of the present invention to provide a joining system that can be partially pre-installed, and which reduces the number of installation steps to, in turn, substantially reduce the time involved in assembling and installing a light fixture.

These and other objectives and advantages of the present invention will become apparent from the following detailed written description, drawing figures, and claims.

SUMMARY OF THE INVENTION

To accomplish the aforementioned objectives, embodiments of the present invention provide for a joiner bracket system that includes a pair of joiner brackets that each engage with rails formed on the internal walls of light fixture sections, which joiner brackets have symmetric and complementary shapes that interlock with each other. A pair of angled fasteners can be driven within the brackets to pull the pair of joiner brackets together, to in turn adjoin their respective fixture sections. A cross-screw or other fastening arrangement may be utilized to enable adjacent light fixtures to be brought together by the action of the fasteners themselves, which may be tightened as desired, such that the adjacent light fixtures are sufficiently joined, with little to no gap present at the joint. In an example, each joiner bracket may be the same identical component, each of which has a geometric shape that enables oppositely oriented joiner brackets to interlock. The joiner bracket system may also include vertical supports that are integrally formed with the joiner brackets themselves and/or are attached to the joiner brackets, which may serve as a light shield to cover the gap between adjoining light sections and to further reduce light leakage.

According to a first aspect of the present invention, there is provided a light fixture system. The light fixture system includes a first fixture section having a first end and a second end opposite the first end, a first sidewall and a second sidewall each extending from the first end to the second end, and a first rail and a second rail positioned along the first and second sidewalls of the first fixture section, respectively. The light fixture system also includes a second fixture section having a first end and a second end opposite the first end, a first sidewall and a second sidewall each extending from the first end to the second end, and a first rail and a second rail positioned along the first and second sidewalls of the second fixture section, respectively. The light fixture system further includes a first joiner bracket adapted to rigidly couple with the first and second rails of the first fixture section. The first joiner bracket includes (i) a first bore having a central axis extending therethrough and (ii) a first boss having a central axis extending therethrough. Additionally, the light fixture system includes a second joiner bracket adapted to rigidly couple with the first and second rails of the second fixture section. The second joiner bracket includes (i) a second bore having a central axis extending therethrough and (ii) a second boss having a central axis extending therethrough, in which the first and second joiner brackets are configured to interlock with each other such that (a) the central axes of the first bore and the first boss are in substantial alignment and (b) the central axes of the second bore and the second boss are in substantial alignment. Further, the light fixture system includes a first fastener adapted to extend through the first bore and the first boss. The light fixture system additionally includes a second fastener adapted to extend through the second bore and the second boss. Engaging at least one of the first and second fasteners may pull together the first and second joiner brackets to, in turn, join the first and second fixture sections.

In some embodiments according to the first aspect, the fasteners may be threaded screws, and each of the first and second bosses may also be threaded to engage a respective one of the screws.

In some embodiments according to the first aspect, the first joiner bracket and the second joiner bracket are interchangeable, or otherwise of an functionally identical construction.

In some embodiments according to the first aspect, the first joiner bracket also includes a vertically extending paddle and/or flanges (e.g., flanges 214 and 234 shown and described with respect to the figures) which are adapted to substantially align with the second sidewalls of the first and second fixture sections. In these embodiments, the lighting fixture system may also include a light shield positioned between the paddle and the second sidewalls of the first and second fixture sections. The light shield may be configured to substantially cover an interface between the first and second fixture sections, to preclude the seepage of light between the respective ends of the first and second fixture sections.

According to a second aspect of the present invention, there is provided joiner system for joining a first fixture section to a second fixture section. The joiner system includes a first joiner bracket adapted to rigidly couple with the first fixture section. The first joiner bracket includes (i) a first bore having a central axis extending therethrough and (ii) a first threaded boss having a central axis extending therethrough. The joiner system also includes a second joiner bracket adapted to rigidly couple with the second fixture section. The second joiner bracket includes (i) a second bore having a central axis extending therethrough and (ii) a second threaded boss having a central axis extending therethrough, where the first and second joiner brackets are configured to interlock with each other such that (a) the central axes of the first bore and the first threaded boss are in substantial alignment and (b) the central axes of the second bore and the second threaded boss are in substantial alignment. The joiner system further includes a first threaded fastener adapted to extend through the first bore and the first threaded boss. Additionally, the joiner system includes a second threaded fastener adapted to extend through the second bore and the second threaded boss. Engaging the first and second threaded fasteners may pull together the first and second joiner brackets.

In some embodiments according to the second aspect, the first joiner bracket and the second joiner bracket are identically shaped so as to be operably interchangeable.

In some embodiments according to the second aspect, the first bore is an elongated bore having a major axis that is larger than a diameter of said first threaded fastener.

In some embodiments according to the second aspect, the first joiner bracket has a first end and a second end. In these embodiments, the joiner bracket may also include a vertically extending paddle extending substantially downwardly from the first end of said first joiner bracket. The joiner system may further include a light shield positioned in substantial alignment with the paddle. The light shield may be adapted for substantially covering an interface between the first and second fixture sections.

In some embodiments according to the second aspect, the first joiner bracket has a first end and a second end, and the first joiner bracket also includes a first shelf positioned proximate the first end. The first shelf of the first joiner bracket has a lower surface that is positioned at a first height. The second joiner bracket also has a first end and a second end, with the first ends of the first and second brackets being in alignment and the second ends of the first and second brackets being in alignment. The second joiner bracket further includes a second shelf positioned proximate the first end, the second shelf of the second joiner bracket having an upper surface positioned at a second height. The second height is lower than the first height, such that the second shelf of the second joiner bracket is positionable at least partially underneath the first shelf of the first joiner bracket.

Further to the above embodiment, the first joiner bracket may also include a second shelf positioned proximate the second end. The second shelf of the first joiner bracket may have an upper surface positioned at the second height. Additionally, the second joiner bracket may include a first shelf positioned proximate the second end. The first shelf of the second joiner bracket may have a lower surface that is positioned at the first height, with the second height being lower than the first height, such that the first shelf of the second joiner bracket is positionable at least partially underneath the second shelf of the first joiner bracket.

According to a third aspect of the present invention, there is provided a joiner bracket used in a joining system for joining a first fixture to a second fixture. The joiner bracket has a first end, a second end, and a centerline halfway between the first and second ends. The joiner bracket includes a first vertical flange at the first end adapted for slidable positioning through a first channel of the first fixture. The joiner bracket also includes a first shelf extending over and above at least a portion of the first vertical flange, the first shelf being positioned proximate the first end. The first shelf is also adapted for slidable positioning over the first channel of the first fixture, and has a lower surface positioned at a first height. The joiner bracket further includes a coupling boss positioned proximate the first side having a central axis extending therethrough at a first angle relative to the first shelf. Additionally, the joiner bracket includes a second vertical flange at the second end adapted for slidable positioning through a second channel of the first fixture. Further, the joiner bracket includes a second shelf adjacent to the second vertical flange and positioned proximate to the second end, the second shelf having an upper surface positioned at a second height that is is less than the first height. The joiner bracket also includes an angled bore hole positioned proximate the second end having a central axis extending therethrough at a second angle relative to the second shelf, where the first angle and the second angle are congruent.

In some embodiments according to the third aspect, the joiner bracket also includes a vertically extending paddle extending substantially downwardly from first vertical flange. The first vertical flange and the paddle have outer walls proximate to the first end that are substantially parallel to each other.

In some embodiments according to the third aspect, the joiner bracket also includes a first bridge extending between the first flange and the first shelf. The first bridge may have formed therethrough one or more holes adapted to receive one or more respective fasteners.

In some embodiments according to the third aspect, the joiner bracket further includes a second bridge extending between the second flange and the second shelf. The second bridge may have formed therethrough one or more holes adapted to receive one or more respective fasteners.

The foregoing summary is illustrative only and is not intended to be in any way limiting. In addition to the illustrative aspects, embodiments, and features described above, further aspects, embodiments and features will become apparent by reference to the drawing figures, the following detailed description, and the claims.

BRIEF DESCRIPTION OF THE DRAWINGS

For a better understanding of the invention, and to show how the same may be implemented, there will now be described, by way of example, specific embodiments, methods and processes according to the present invention with reference to the accompanying drawings in which:

FIG. 6A is a front perspective view of the example fastener joiner system in an untightened state, according to the embodiment of FIG. 2;

FIG. 6B is a rear perspective view of the example fastener joiner system in tightened state, according to the embodiment of FIG. 2;

FIGS. 8A-8C are detailed, side elevated sectional views of the joiner system brackets, illustrating an example tightening procedure for adjoining adjacent fixture sections of the light fixture shown in FIGS. 1 and 7;

DETAILED DESCRIPTION OF THE EMBODIMENTS

Figure 1A:
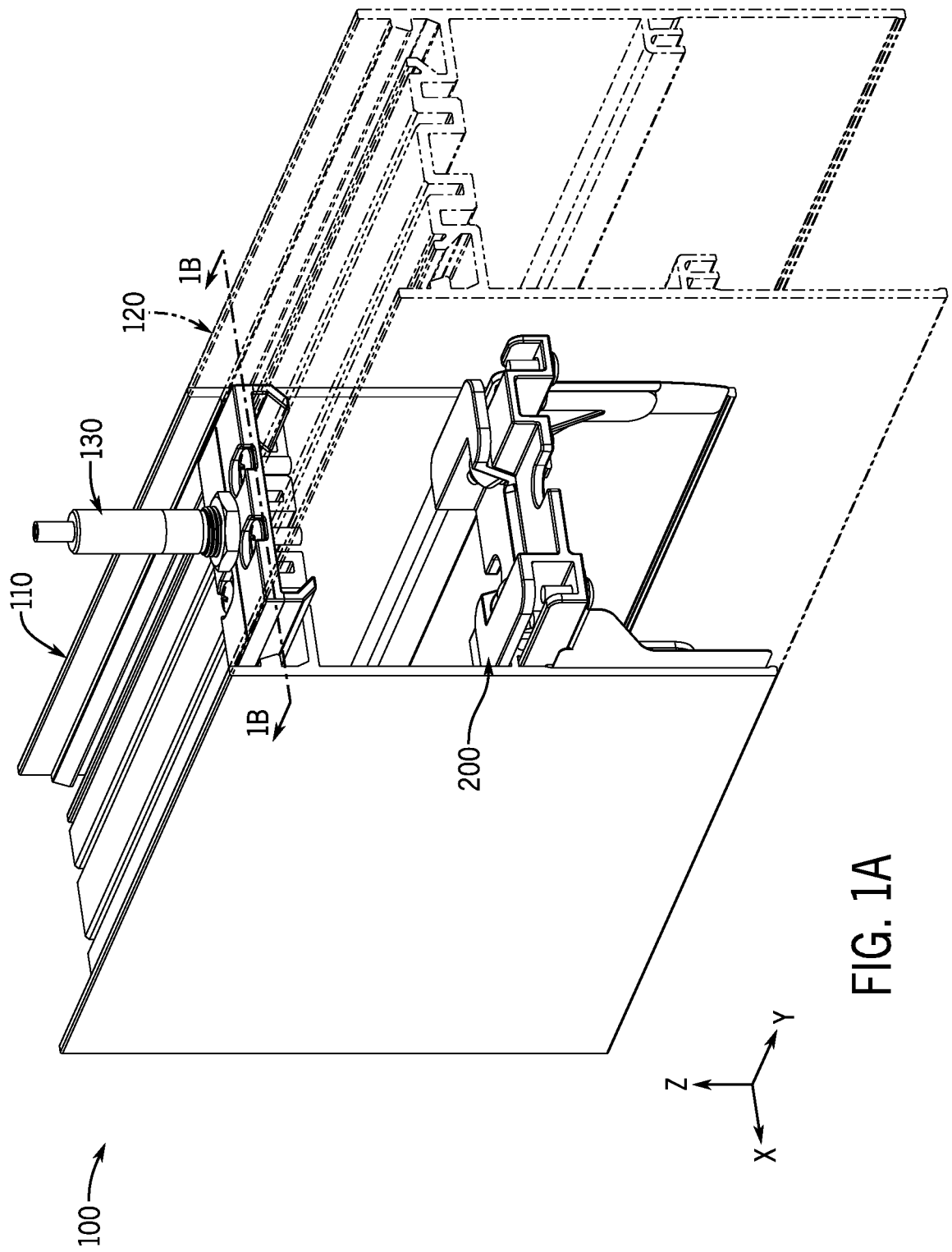
FIG. 1A is a perspective view of a light fixture assembly showing an example fastener joiner system of the present invention, in which the joiner fasteners are not shown.

There will now be described by way of example, several specific modes of the invention as contemplated by the inventor. In the following description, numerous specific details are set forth in order to provide a thorough understanding. It will be apparent however, to one skilled in the art, that the present invention may be practiced without limitation to these specific details. In other instances, well known methods and structures have not been described in detail so as not to unnecessarily obscure the description of the invention.

Embodiments of the present invention provide for a fastenable joiner bracket system for adjoining adjacent light fixture sections. As described above, it can be challenging and dangerous for technicians to assemble suspended fixture sections during the installation of a light fixture. Some joining systems may be inexpensive and simple to manufacture, but such systems often require the technician to perform risky or cumbersome maneuvers, leading to frustration, misalignment and/or possible injury. Other more robust joining systems have attempted to simplify the installation process for the technician, but the increased robustness typically renders those systems significantly more expensive. Regardless of the simplicity or robustness of these joining systems, many existing joining systems fail to consistently bring together fixture sections in a manner that is efficient, well-aligned, aesthetically pleasing, strong, and reliable. The joiner bracket systems shown and described herein address these problems simultaneously, by reducing the number of unique components that comprise the joiner bracket system, and by providing a cross-screw or other fastener designs that enable adjacent fixture sections to be effectively aligned to minimize any gaps between the joint and tightened safely and with relative ease.

An example joiner bracket system of the present disclosure may include a pair of joiner brackets that interlock with each other, such that corresponding bores, threaded bosses or cammed fittings can align, and through which screws or bayonet posts may extend. Each joiner bracket may include flanges that extend into and slide along corresponding rails formed in the housing of a light fixture section, and may be rigidly affixed to its respective light fixture section with fasteners that engage with a portion of the rail. The central axis of each aligned bore and threaded or cammed boss may be angled relative to each other. Screws or posts being driven through the angled and aligned bores and threaded or cammed bosses may simultaneously provide both an upward force to push the joiner brackets into the rails, and a horizontal force to pull the aligned joiner brackets together.

The present application includes the realization that the a joiner system may be constructed in which one joiner bracket design is used for multiple, differently-oriented piece parts within the joiner system, by designing a joiner bracket which is asymmetric to itself, but which has complementary, interlocking portions when two of the same, identical oppositely-oriented joiner brackets are brought together. For example, a joiner bracket of the present application may include a lower, narrower "shelf" (e.g., a plateau-like raised portion) on one side, and a higher, wider shelf on the opposite side—such that the lower, narrower shelf of one joiner bracket can fit within the higher, wider shelf of another identical, but oppositely-oriented bracket. By designing each element in this manner, a single joiner bracket design may be used in a two-bracket cross-screw joiner system, as an example.

As described herein, a joiner bracket may be referred to as "rotationally interlocking" with itself. For the purposes of the present disclosure, a joiner bracket that is "rotationally interlocking" refers to a structure that, if positioned next to a reoriented but otherwise identical structure (e.g., rotated about a vertical axis by 180 degrees), has surfaces that are complementary to the now-adjacent surfaces of the reoriented structure. In other words, the joiner bracket may be, to some extent, a three-dimensional tessellating design—at least with respect to the surfaces facing each other that interlock with one another. More generally, a joiner bracket that is rotationally interlocking may be of a shape that enables two or more of the same bracket to be used to form a cross-screw or cross-post joiner system.

As described herein, two joiner brackets may also be described herein as "the same," "identical," "the same design," or "interchangeable"—all of which refer to a pair of joiner brackets where both brackets share a common design, such that they may be manufactured as the same part using the same model, mold, tooling, etc. It will be appreciated by one of ordinary skill that two parts may not be precisely identical to each other (e.g., due to manufacturing tolerances, slight damage to the parts, and/or for other reasons), yet still be "interchangeable" or otherwise serve as either bracket within a joiner system.

As described herein, upwardly illuminating light fixtures may be referred to as "indirect" (e.g., illuminating the ceiling), downwardly illuminating light fixtures may be referred to as "direct" (e.g., illuminating the floor or other surfaces beneath the light fixture), and upwardly and downwardly illuminating light fixtures may be referred to as "bidirectional."

As described herein, a "cross-screw" or "cross-post" arrangement may refer to any joiner system design in which two or more fasteners (screws or otherwise) are each driven through two or more joiner brackets at opposite or complementary angles. In some cases, a cross-screw arrangement may include screws that are driven through a joiner system at opposite ends.

The following description of FIGS. 1A-10 may include position and orientation terminology related to light fixture assemblies and/or components therein. Each of the figures has included therewith a set of x-y-z axes that will be used to describe the relative position and/or orientation of components. Any particular terminology used to denote the location, orientation, and/or direction of movement of parts is used for explanatory purposes only.

FIG. 1A illustrates perspective view of light fixture assembly 100, with fastenable joiner system 200 attached therewithin. Light fixture assembly 100 includes a pair of adjacent fixture sections 110 and 120, which are in alignment and rigidly held together by joiner system 200 and cable gripper and bracket assembly 130. Fixture section 120 is shown in dashed lines in FIG. 1A to illustrate the positioning of joiner system 200 within light fixture assembly 100.

Fixture sections 110 and 120 may each be formed as an extruded aluminum housing, for example, and incorporate one or more rails, lips, channels, bores, threaded screw holes, and/or other features to which various elements may be affixed or with which various elements may engage. For example, rails 112, 114, 122, and 124 (see FIGS. 1B, 9A, 9B, and 10) may protrude inwardly from the inner walls of fixture sections 110 and 120, with which portions of joiner system 200 may slidably engage, and/or to which fasteners may be driven to rigidly affix joiner system 200 to fixture sections 110 and 120. In addition, channels formed along the top surfaces of fixture sections 110 and 120 (in the positive z-direction) may provide anchor points for screws to affix cable gripper and bracket assembly 130 to light fixture assembly 100. The channels may also serve as anchor points for affixing light sources (e.g., light emitting diodes, or LEDs) to the outer surfaces of fixture sections 110 and 120 and pointed upwardly (in the positive z-direction) for "indirect" lighting, and/or for affixing light sources to the inner surfaces of fixture sections 110 and 120 and pointed downwardly (in the negative z-direction) for "direct" lighting.

Figure 1B:
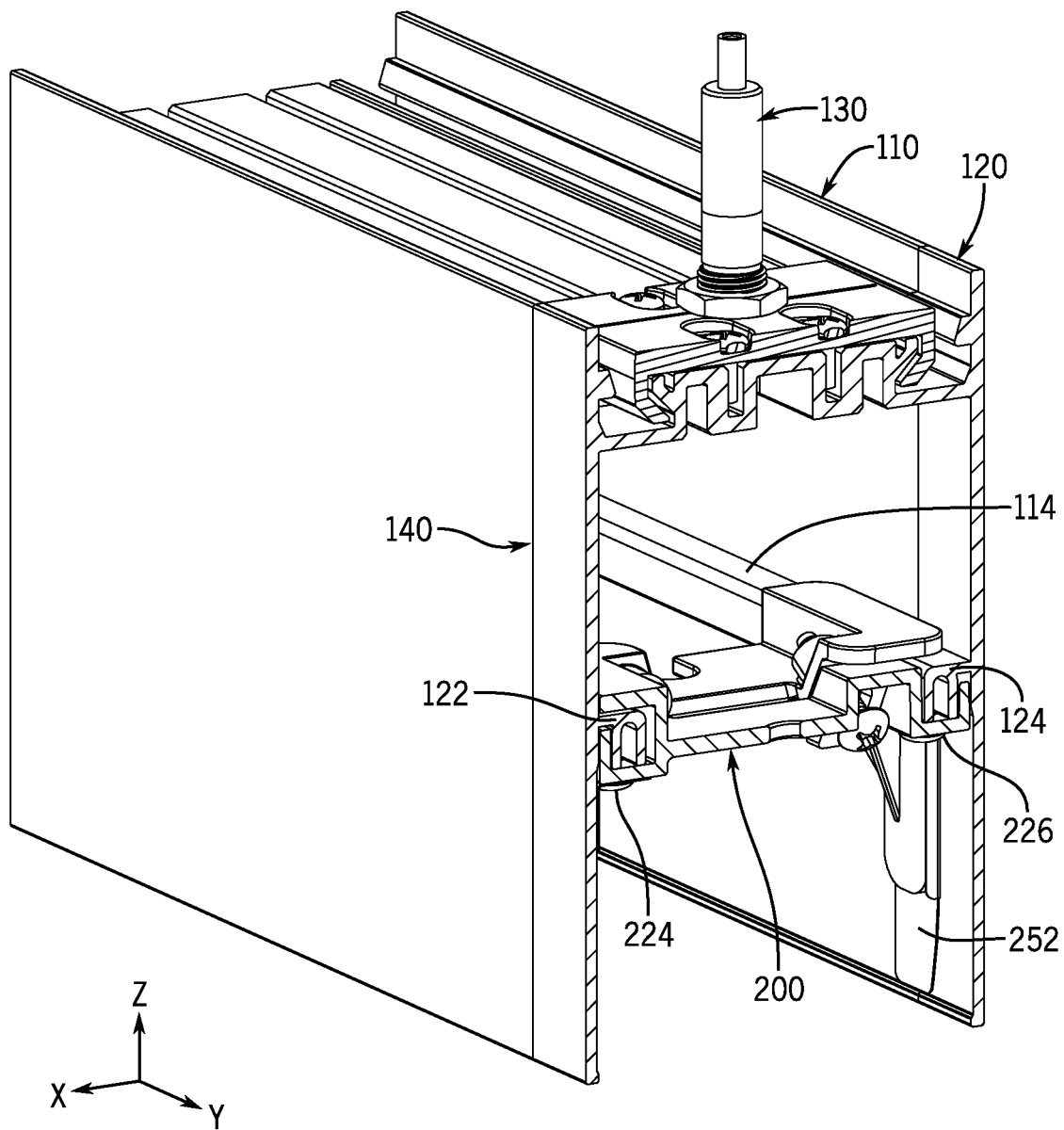
FIG. 1B is a perspective cross-sectional view of the light fixture assembly and the example fastener joiner system, taken along lines 1B-1B shown in FIG. 1A, in which a joiner fastener is shown.

FIG. 1B depicts a cross-sectional perspective view of light fixture assembly 100 and a portion of joiner system 200, taken along lines 1B-1B shown in FIG. 1A. With light fixture assembly 100 in an assembled state, rail 114 of fixture section 110 is in substantial alignment with rail 124 of fixture section 120. Likewise, rail 112 of fixture section 110 (see FIGS. 9A and 9B) is in substantial alignment with rail 122 of fixture section 120. Fixture sections 110 and 120 abut and are maintained in immediate juxtaposition by joiner system 200, such that gap 140 is substantially closed and sealed. In some embodiments, joiner system 200 includes one or more light blocking objects, such as light shields 252 and 254 (see FIG. 2), which may be positioned over and across gap 140 to reduce the extent to which light emitted from light sources within light fixture assembly 100 escapes through gap 140.

Figure 2:
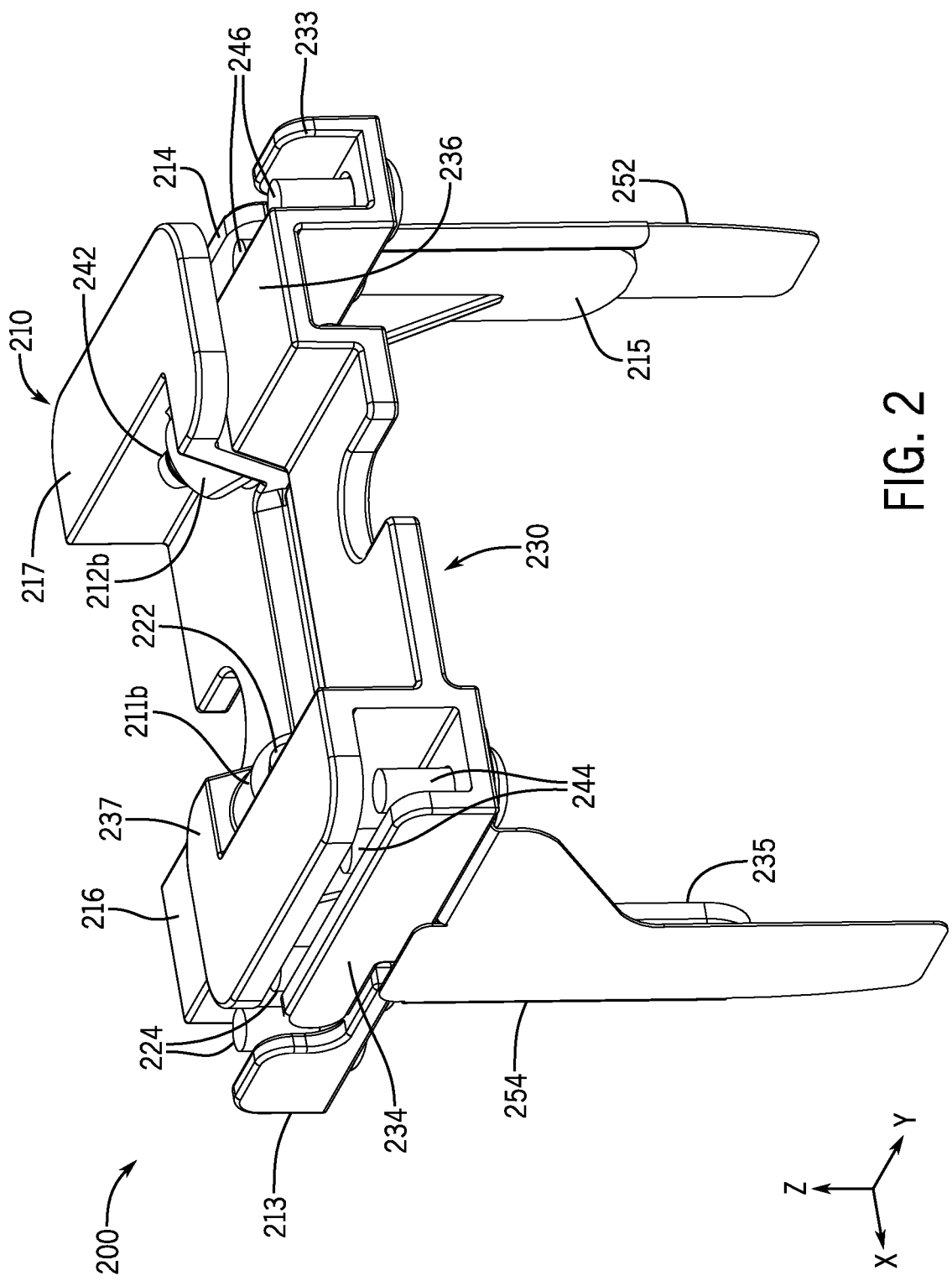
FIG. 2 is a perspective view of the example fastener joiner system, comprising two aligned and juxtaposed joiner brackets, according to the embodiment of FIG. 1A.
Figure 3A:
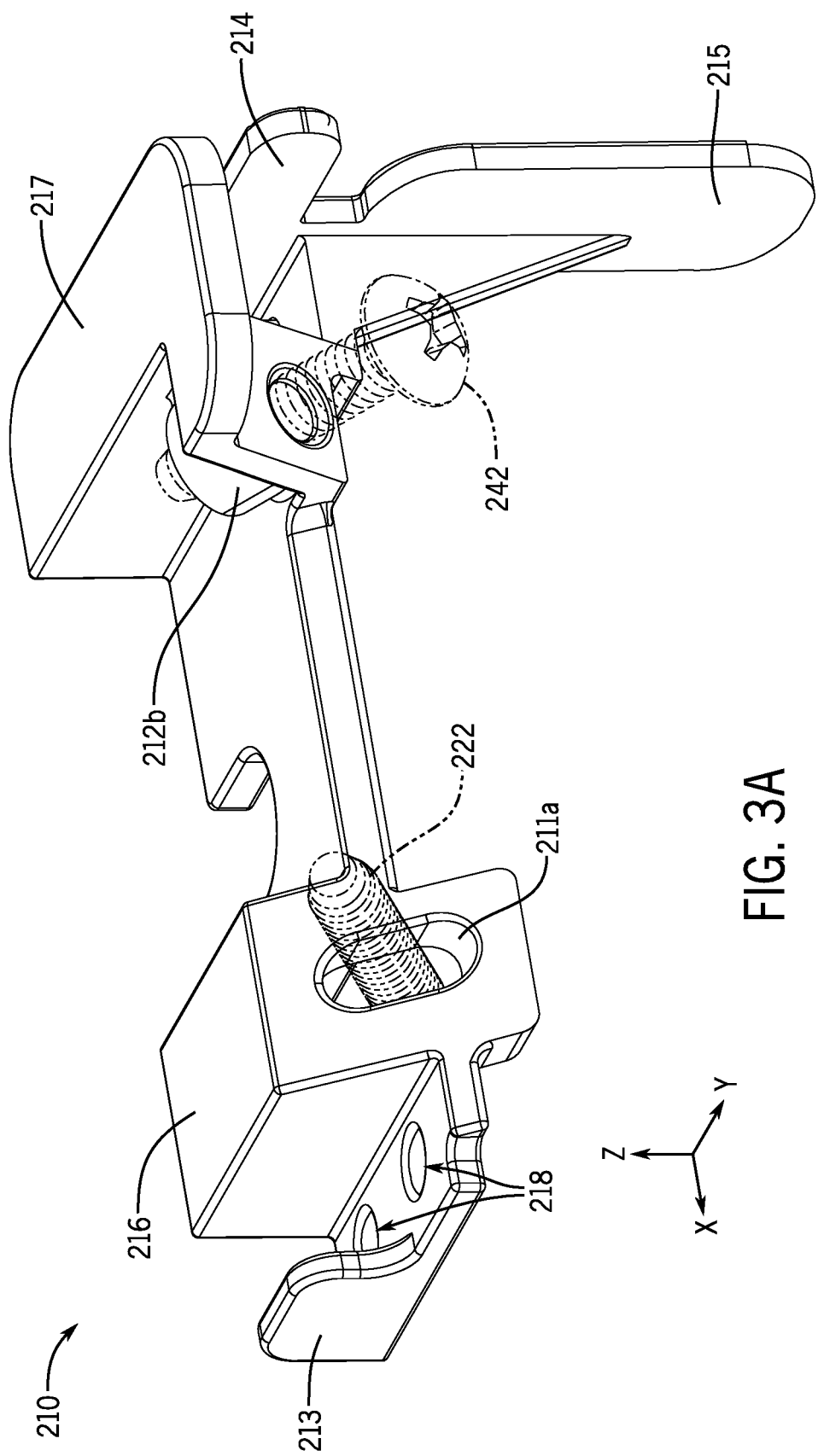
FIG. 3A is a front perspective view of a joiner bracket of the example fastener joiner system, according to the embodiment of FIG. 2.

FIG. 2 illustrates a perspective view of joiner system 200, which includes joiner bracket 210, joiner bracket 230, a plurality of fasteners shown more clearly in FIG. 3A, and a pair of light shields 252 and 254. At one end, bracket 210 includes a vertical flange 213 which connects to a shelf 216 by way of a bridged section, which includes holes 218 (see FIG. 3A) through which fasteners 224 and 244 extend. Another shelf 217 is positioned near the opposite end (in the negative x-direction), which extends over and above another vertical flange 214. In this example, shelf 217 is comparatively "taller" (in the positive z-direction) than shelf 216. Shelf 216 includes a sloped wall through which elongated bore 211a (shown more clearly in FIG. 3A) extends. Adjacent to shelf 217 is threaded boss 212b, which is angled similarly to that of the sloped wall of shelf 216. Another bridged section extends horizontally between shelf 217 and flange 214, which includes holes 219 (see FIGS. 3B and 5A) through which fasteners 224 and 244 may be extended (see FIG. 9B).

Although bosses 211b and 212b are described herein as "threaded" bosses, bosses 211b and 212b may alternatively be manufactured as smooth "pilot" bores without any threading formed therein. In an example assembly process, thread forming "self-tapping" screws may be driven through bosses 211b and 212b (e.g., by an end user, a technician, etc.), which forms threads within bosses 211b and 212b. In other examples, non-threaded fasteners (or fasteners with threads that do not engage with bosses 211b and 212b) may be used, and bosses 211b and 212b may remain as smooth, non-threaded bosses.

Similarly, joiner bracket 230 includes vertical flange 233 which connects to a shelf 236 by way of a bridged section, which includes holes 238 (see FIG. 5A) through which fastener 246 extends. Another shelf 237 is positioned near the opposite end (in the positive x-direction), which extends over and above another vertical flange 234. Similar to joiner bracket 210, shelf 237 is comparatively "taller" (in the positive z-direction) than shelf 236. Shelf 236 includes a sloped wall through which elongated bore 212a (see FIG. 5A) extends. Adjacent to shelf 237 is threaded boss 211b, which is angled similarly to that of the sloped wall of shelf 236. Another bridged section extends horizontally between shelf 237 and flange 234, which includes holes 239 (see FIG. 5A) through which fasteners 224 or 244 may be extended.

As shown in the figures and as described herein, joiner brackets 210 and 230 may have similar or the same identical construction. In some implementations, joiner bracket 230 may be the same part as joiner bracket 210, but is oriented 180 degrees apart, about the z-axis. In this manner, joiner brackets 210 and 230 may be described as "rotationally interlocking," in that the adjacent portions of oppositely oriented joiner brackets 210 and 230 have complementary shapes and dimensions to allow joiner bracket 210 to interlock with joiner bracket 230. For example, shelf 216 of joiner bracket 210 slides underneath shelf 237 of joiner bracket 230, while shelf 236 of joiner bracket 230 likewise slides underneath shelf 217 of joiner bracket 210. As another example, the sloped wall with elongated bore 211a is angled such that it is substantially parallel to the sloped wall with threaded boss 211b. As additional examples, flange 213 has a curved wall that accommodates a lobe of flange 234, and likewise flange 233 has a curved wall that accommodates a lobe of flange 214. These various complementary features illustrate that manner in which joiner brackets 210 and 230 have a rotational, complementing alignment, in that two of the same parts oriented oppositely about the z-axis can interlock with each other.

With joiner brackets 210 and 230 positioned so as to be substantially interlocking, a pair of screws 222 and 242 may be driven through joiner brackets 210 and 230 to pull them together (and to pull together the fixture sections 110 and 120 to which joiner brackets 210 and 230, respectively, may be affixed). Elongated bore hole 211a of joiner bracket 210 may substantially align with threaded boss 211b of joiner bracket 230 (e.g., their central axes being in substantial alignment with each other), through which screw 222 may be secured. Likewise, elongated bore 212a of joiner bracket 230 may substantially align with threaded boss 212b of joiner bracket 210, through which screw 242 may be driven. By turning screw 222 and/or screw 242, joiner brackets 210 and 230 are drawn together.

In some embodiments, joiner bracket 210 may also include paddle 215, which acts as a vertical support for joiner bracket 210. Similarly, joiner bracket 230 may include paddle 235 to provide vertical support for joiner bracket 230. Paddles 215 and 235, together with flanges 214 and 234, may enhance the structural stability and alignment of joiner brackets 210 and 230, and increase the structural integrity of light fixture assembly 100 overall. In addition, in some implementations, light shields 252 and 254 may be positioned adjacent paddles 215 and 235 and the inner walls of fixture sections 110 and 120. Light shields 252 and 254 may be, for example, thin pieces of metal or the like that extends substantially to the bottom of the fixture sections 110 and 120, and serves to block light from escaping through gap 140 between fixture sections 110 and 120. Light shields 252 and 254 may be affixed to cross-screw joiner system 200, or may be held in place between cross-screw joiner system 200 and the inner walls of fixture sections 110 and 120 through pressure applied by paddles 215 and 235.

Figure 3B:
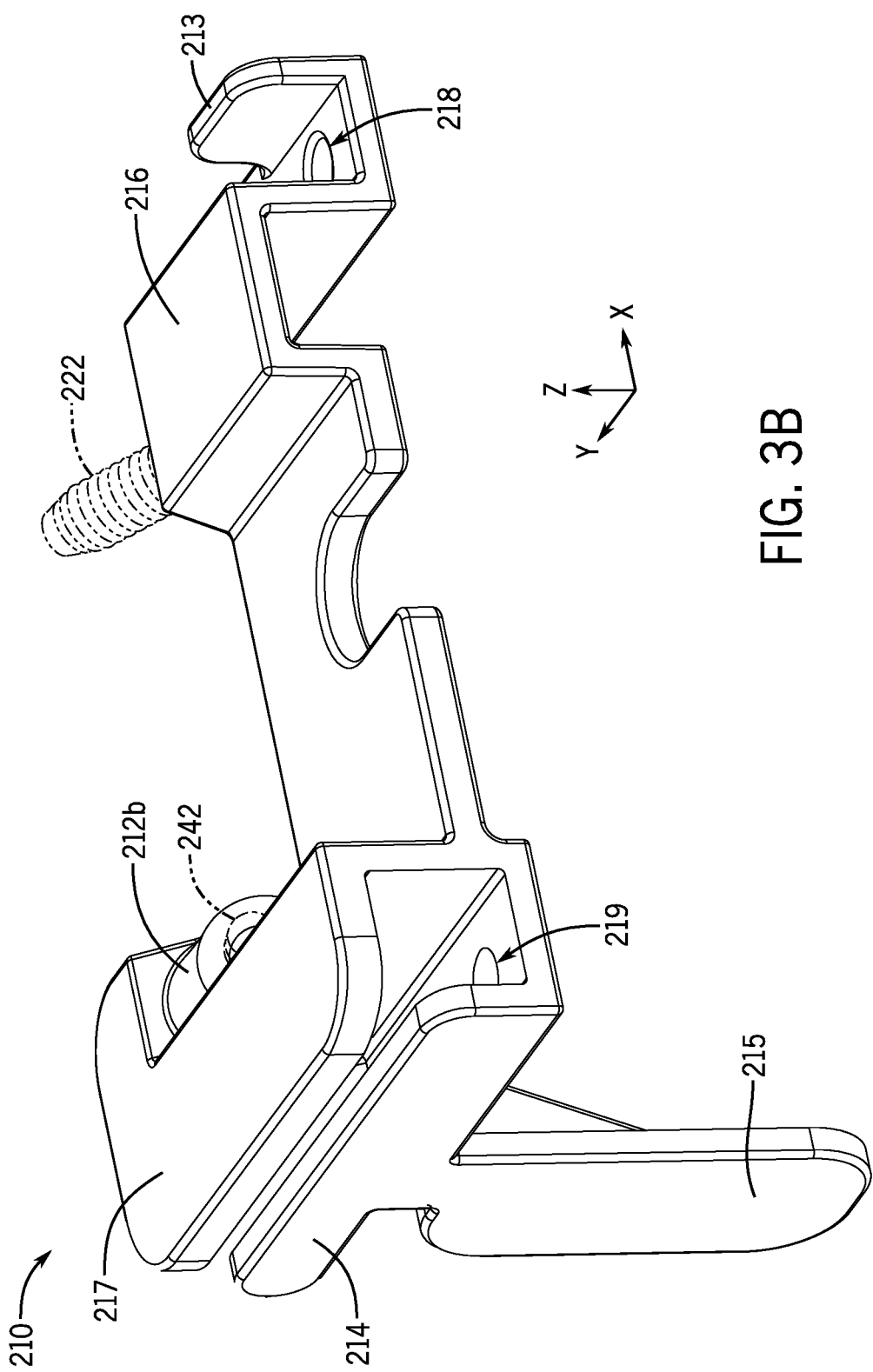
FIG. 3B is a rear perspective view of a joiner bracket of the example fastener joiner system, according to the embodiment of FIG. 2.

FIGS. 3A and 3B illustrate front and rear perspective views of joiner bracket 210. In FIGS. 3A and 3B, screws 222 and 242 are drawn in dashed lines so as not to obscure details of joiner bracket 210 behind them. As shown in FIG. 3A, elongated bore 211a is substantially wider than the diameter of screw 222, to allow screw 211a to move in the y- and z-directions to some extent (compared to a diameter-matched threaded boss). Elongated bore 211a (and elongated bore 212a) may permit fixture sections 110 and 120 to be slightly misaligned in the y- and z-directions, while still enabling screw 222 to align and engage with threaded boss 211b of joiner bracket 230. In this manner, the robustness of cross-screw joiner system 200 may be improved, and able to operate successfully within a range of manufacturing tolerances and assembly tolerances (e.g., due to human error)—allowing joiner system 200 to tolerate some degree of misalignment between fixture sections 110 and 120.

Figure 9A:
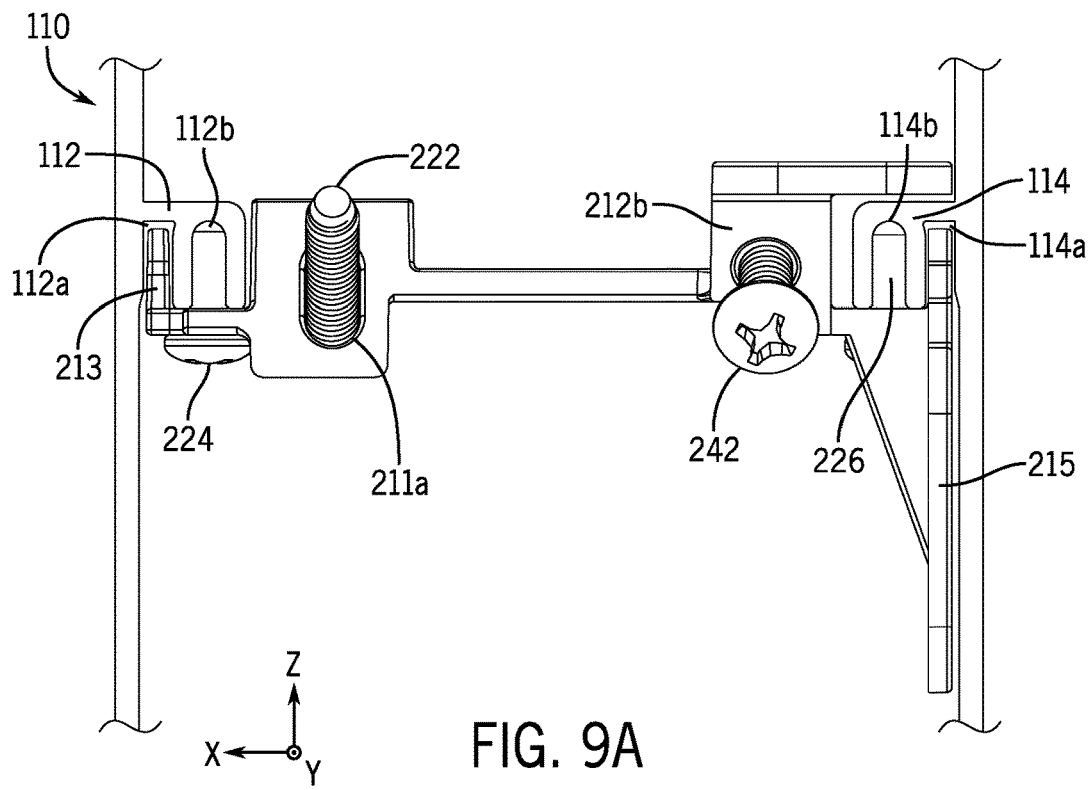
FIG. 9A is a detailed front elevated view showing a joiner bracket of the example joiner system engaged with and coupled to the rails of a fixture section.
Figure 9B:
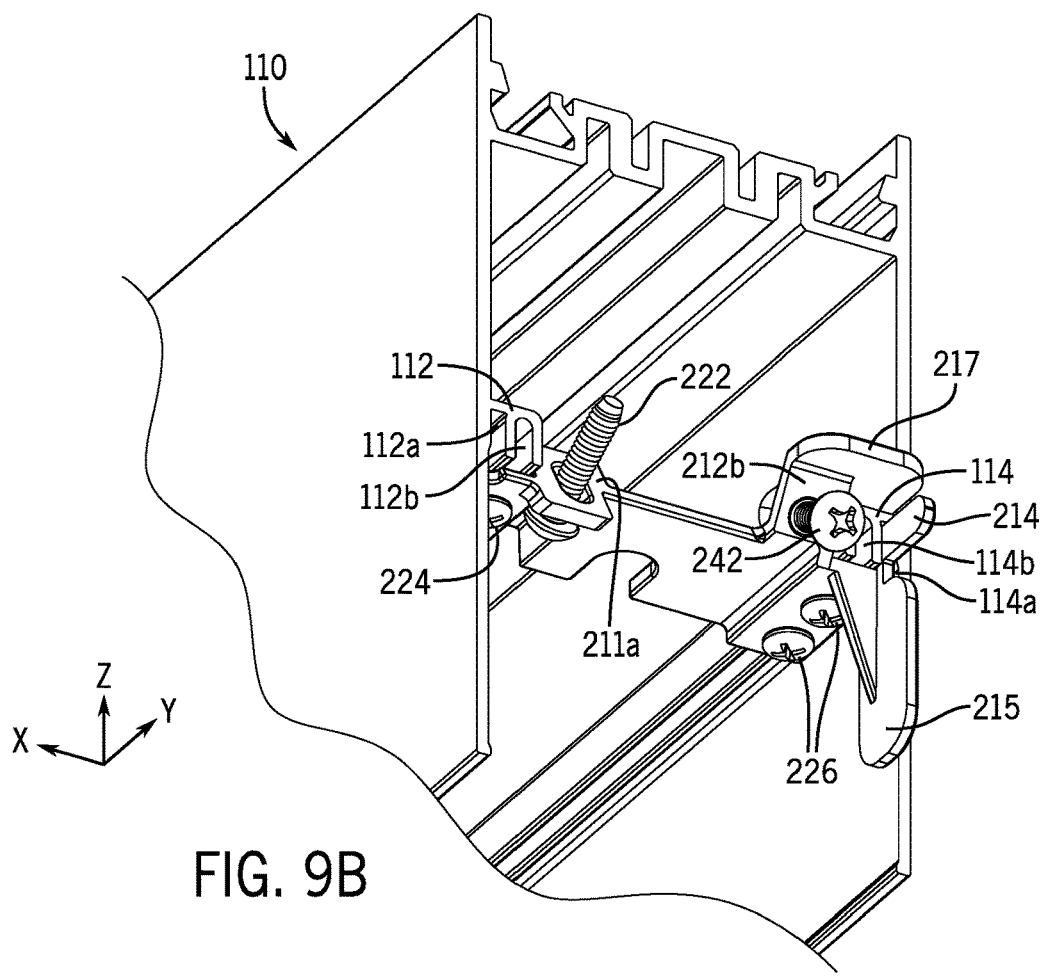
FIG. 9B is a detailed perspective view of FIG. 9A showing a joiner bracket of the example joiner system engaged with and coupled to rails of a fixture section.

As seen in FIG. 3A, shelf 217 extends to a greater height (in the z-direction) relative to shelf 216. When positioned within fixture section 110, shelf 217 extends over and above rail 114. Before joiner bracket 210 is affixed to fixture section 110 by way of fasteners 224 and 226, the lower surface of shelf 217 and paddle 215 may collectively hold joiner bracket 210 in place to be screwed in—as the combination of shelf 217 and paddle 215 effectively encloses about rail 114. In this manner, joiner bracket 210 can be slid into position for fastening, and subsequently secured in place with fasteners 224 and 226, without the need to temporarily hold joiner bracket 210 up and in place. Advantageously, joiner bracket 210 may be installed while fixture sections 110 and 120 are suspended, as joiner bracket 210 would not fall once it is slid part way onto rails 112 and 114 of fixture section 110, as shown in FIGS. 9A and 9B. Joiner brackets 210 and 230 may be installed within fixture sections 110 and 120, respectively, by the manufacturer, such that light fixture subassemblies may be suspended on site, brought together, and secured together by way of fasteners extending through joiner brackets 210 and 230.

Figure 4:
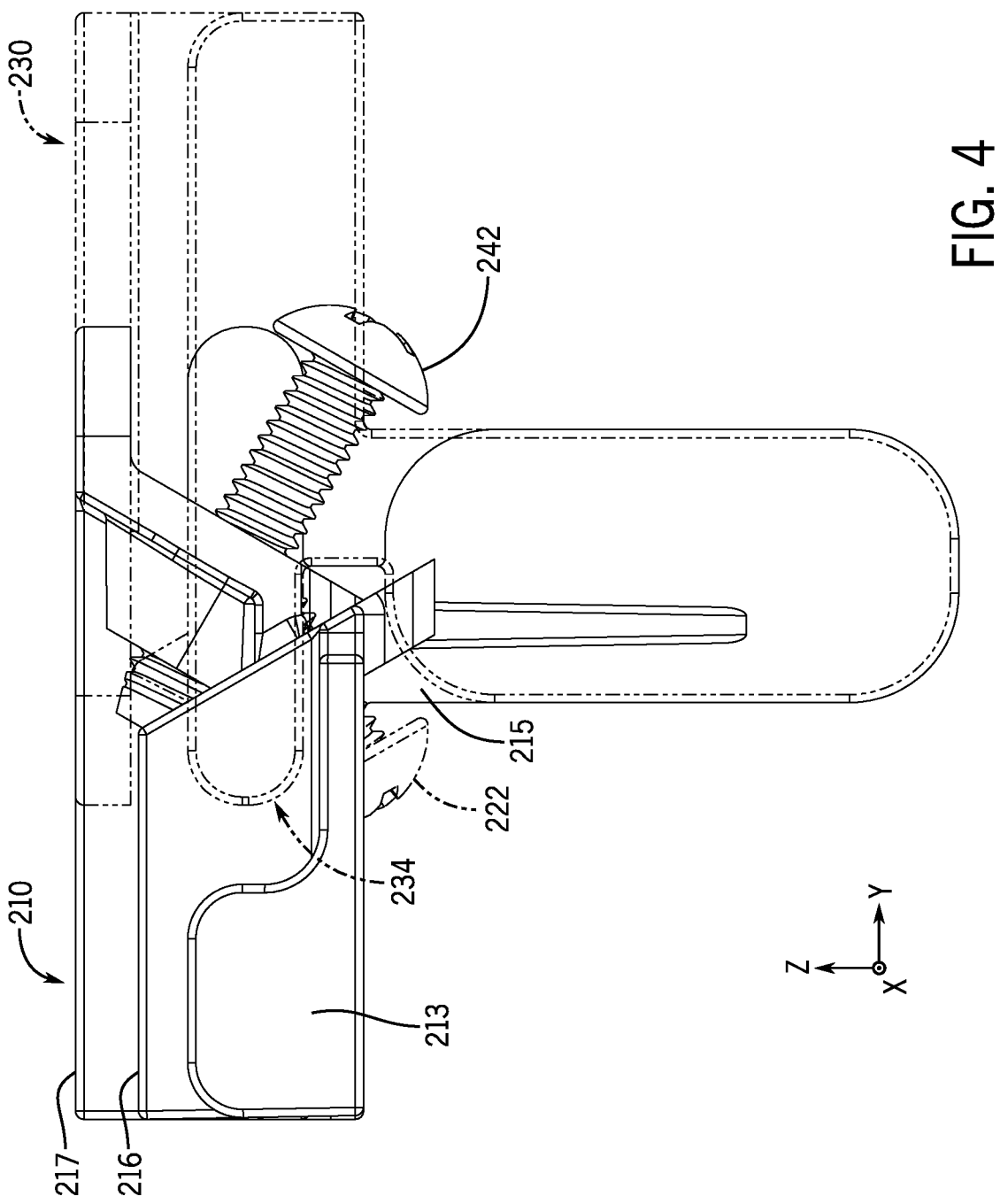
FIG. 4 is a side elevated view of a joiner bracket of the example fastener joiner system, according to the embodiment of FIG. 2.

FIG. 4 depicts a side elevated view of cross-screw joiner system 200, with joiner bracket 230 drawn in dashed lines to illustrate the angled relationship of screws 222 and 242 with respect to each other. From the side elevated view shown in FIG. 4, screws 222 and 242 form an "X" shape, in that they angled upwards in opposite directions. In an example implementation, screws 222 and 242 are angled 30 degrees relative to the y-axis (in opposite directions, such that they are congruent angles). However, the angle of screws 222 and 242 may vary among different implementations—other angles, for example 45 degrees or 60 degrees, may be suitable as well, depending on the particular application. As screws 222 and 242 are driven through their respective bores and threaded bosses, joiner brackets 210 and 230 are gradually aligned and brought together upon rotation of the fasteners.

Figure 5B:
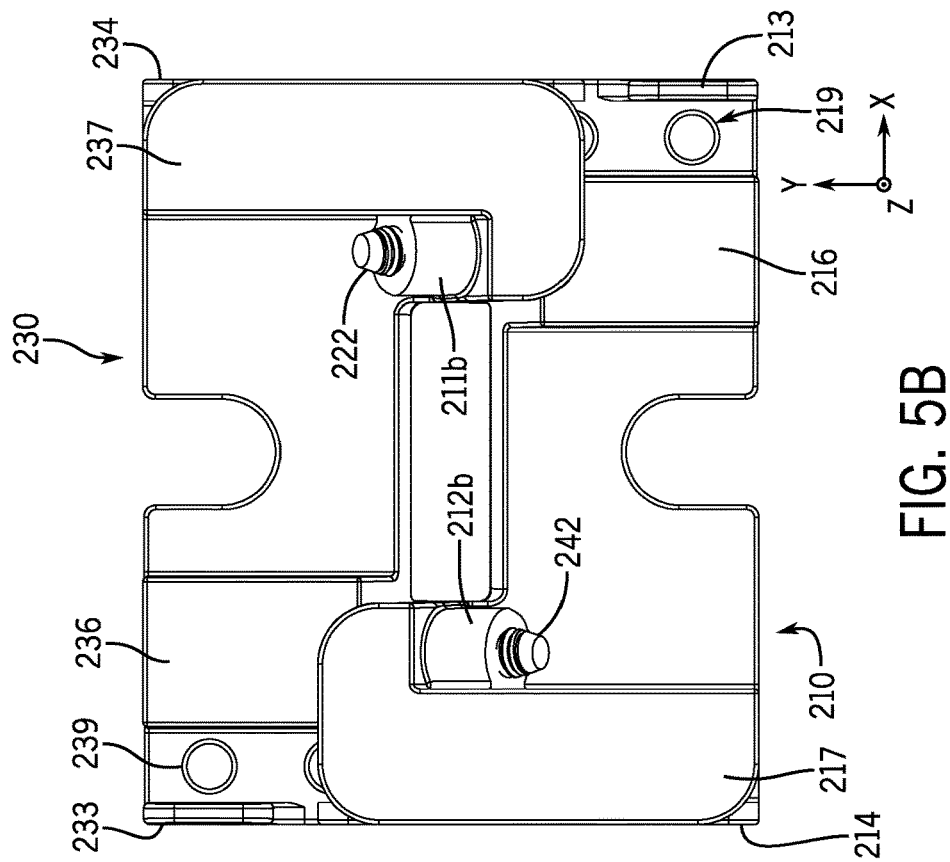
FIG. 5B is a top plan view of the example fastener joiner system, according to the embodiment of FIG. 2.
Figure 5A:
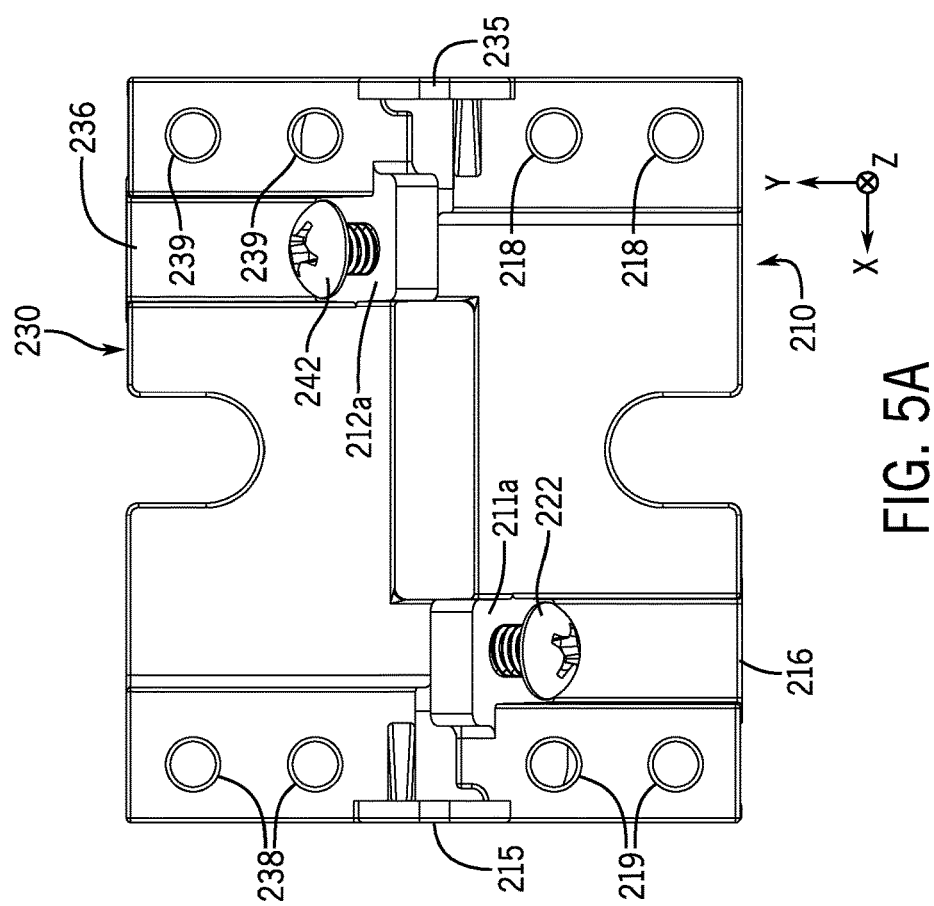
FIG. 5A is a bottom plan view of the example fastener joiner system, according to the embodiment of FIG. 2.

FIGS. 5A and 5B depict bottom and top plan views of joiner system 200, respectively, and further illustrates the extent to which joiner brackets 210 and 230 are complementary and interlocking. The U-shaped cutouts in joiner brackets 210 and 230 may be included to permit easier access to screws or other objects mounted on the inside of light fixture assembly 100, to permit the passage of wiring between adjacent fixture sections, and/or for other various reasons FIGS. 6A and 6B illustrate fixture joiner system 200 in two different states: untightened state 600, and tightened state 610. As shown in FIG. 6A, a significant gap exists between corresponding components (e.g., flanges 213 and 234, flanges 214 and 233, shelves 217 and 236, shelves 216 and 237, etc.), and screws 222 and 242 are not fully extended through threaded bosses 211b and 212b, respectively. As screws 222 and 242 are tightened, the sizes of the gap apparent in FIG. 6A decreases, and joiner brackets 210 and 230 are brought together (in the y-direction). The maximum distance between joiner brackets 210 and 230 may be dictated by the extent to which screws 222 and 242 extend through their respective threaded bosses 211b and 212b. In this manner, joiner system 200 is "tunable," in that it can be tightened or loosened, as desired, to produce a sufficiently tight (and, in some cases, light blocking) joint. Such granular control over the tightness of the joint may be advantageous, as a given joiner system 200 can be adjusted by a technician to account for manufacturing tolerances and other sources of variation in the process of manufacturing light fixture housing sections and/or joiner brackets 210 and 230.

Figure 7:
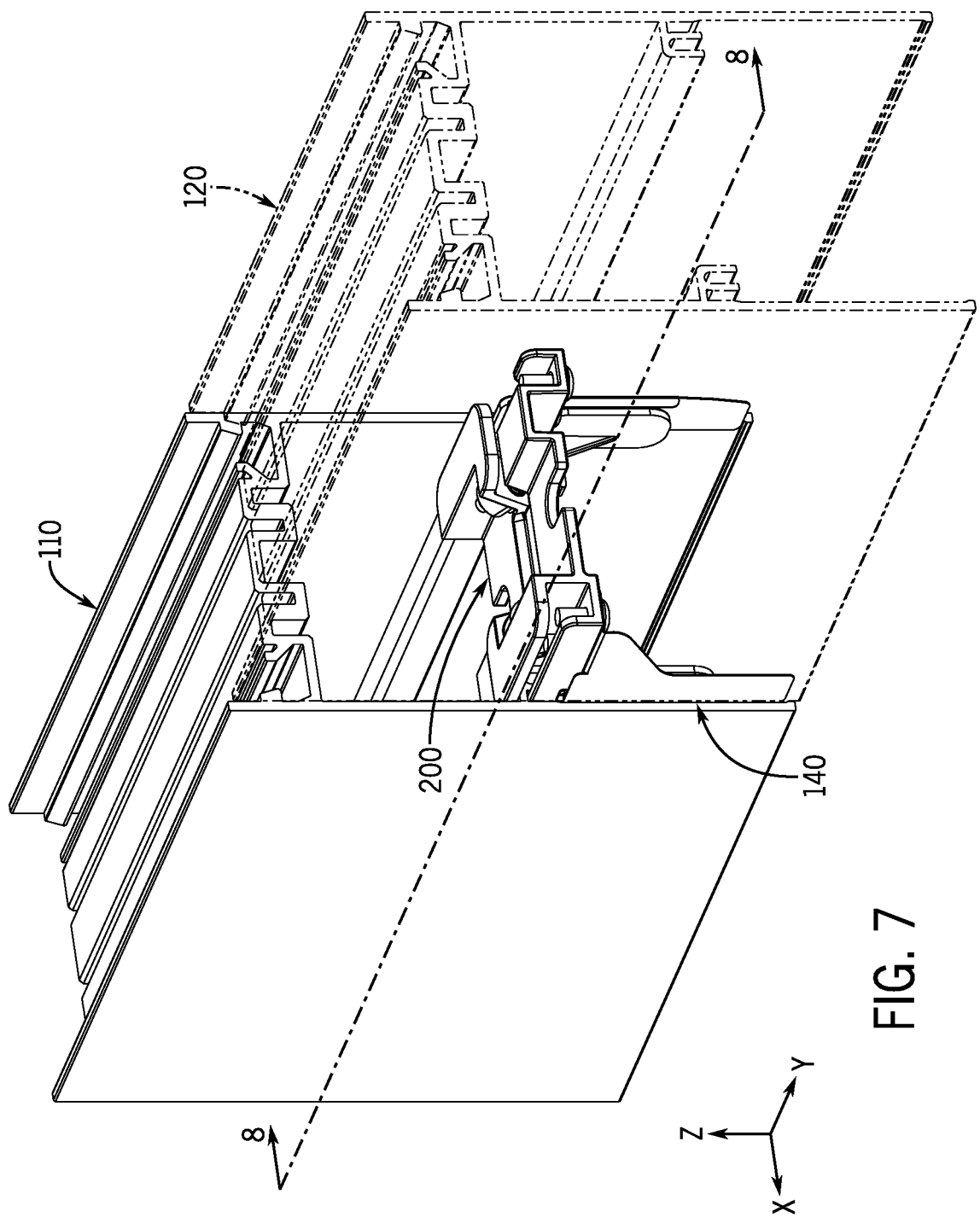
FIG. 7 is a perspective view of the light fixture assembly of FIG. 1A, in which adjacent fixture sections are separated by a substantial gap while the example fastener joiner system brackets are in an untightened state.

FIG. 7 illustrates a perspective view of light fixture assembly 100 similar to FIG. 1A, in which adjacent fixture sections 110 and 120 are separated by a substantial gap 140 (e.g., before the fasteners [screws] of joiner system 200 are tightened). An elevated, cross-sectional side view of FIG. 7 is shown in FIG. 8A, with the sectional plane extending vertically (in the y-z plane) to remove the sidewalls of fixture sections 110 and 120, to expose cross-screw joiner system 200, and slice through screw 222 to illustrate an example tightening procedure. FIG. 8A illustrates an early stage in the tightening process, in which screw 222 is engaged through threaded boss 211b and extends only slightly beyond threaded boss 211b. FIG. 8B illustrates an intermediate stage in the tightening process, with screw 222 being engaged further through threaded boss 211b, pulling together joiner brackets 210 and 230 and, in turn, fixture sections 110 and 120. FIG. 8C illustrates a final stage in the tightening process, with screw 222 extending even further through threaded boss 211b, to the extent where fixture sections 110 and 120 immediately abut to close gap 140.

As shown in FIGS. 8A-8C (as well as in FIG. 9B), the heads of screws 222 and 242 may be beneficially angled downward, so as to be accessible from underneath light fixture assembly 100. In the scenario in which fixture sections 110 and 120 are suspended separately before they are joined together, a technician may be able to access the screws from below fixture sections 110 and 120. This may be beneficial, for instance, in implementations where most of the installation process involves connecting and manipulating wiring, fasteners, and the like on the inside of light fixture assembly 100 (as it is preferred in architectural lighting to keep non-aesthetic elements such as wiring and cables hidden within the fixture). An example installation process may involve a technician bringing together fixture sections 110 and 120, which have installed therewithin joiner brackets 210 and 230, respectively. Flange 214 of joiner bracket 210 may extend into rail 124 of fixture section 120 (see FIG. 1B), while flange 234 may extend into rail 112 of fixture section 110 (see FIG. 10). In this manner, joiner brackets 210 and 230 provide a gravity-imposed friction fit that enables fixture sections 110 and 120 to be held together with a minimal amount of force (e.g., a single hand of a technician). The same technician may first connect any electrical elements (e.g., for power and control) within fixture sections 110 and 120 together, bring together fixture sections 110 and 120, tighten joiner system 200, and attach a diffuser or lens to the bottom of light fixture 100—with all of these steps being performed from below the light fixture. In lieu of threaded screws, bayonet posts and cammed bosses may be utilized in the fastening system.

In some embodiments, an example installation procedure may involve driving one of screws 222 and 242 until it is sufficiently tightened, and subsequently driving the other screw until it is sufficiently tightened. In other words, the action of just one screw 222 or 242 may provide sufficient force to pull together fixture sections 110 and 120, and the other screw may be tightened afterward, for increased strength and to balance the loads and shear forces that cross-screw joiner system 200 experiences.

FIGS. 9A and 9B depict side elevated and perspective views, respectively showing joiner bracket 210 engaged with rails 112 and 114. Rail 112 includes two channels: outer channel 112a, and inner channel 112b. Likewise, rail 114 includes outer channel 114a and inner channel 114b. As shown in FIGS. 9A and 9B, flange 213 of joiner bracket 210 slidably engages with outer channel 112a, while flange 214 slidably engages with outer channel 114a. Holes 218 may vertically align with inner channel 112b to enable fasteners 224 to extend up and into inner channel 112b, thereby rigidly securing joiner bracket 210 to fixture section 110. Similarly, holes 219 vertically align with inner channel 114b, through which fasteners 224 may extend up and into inner channel 114b. Prior to fasteners 224 and 226 being secured to inner channels 112b and 114b, respectively, shelf 217 may rest on top of rail 114 (not shown in FIGS. 9A and 9B) which, in concert with paddle 215, prevents joiner bracket 210 from falling from rails 112 and 114 during the installation process.

Although not shown in FIGS. 9A and 9B, when joiner bracket 210 is properly positioned in rails 112 and 114, flange 214 extends axially (in the positive y-direction) beyond the end of outer channel 114a of fixture section 110 and into a corresponding channel of fixture section 120. Likewise, flange 234 of joiner bracket 230 partially extends into outer channel 112a. These extensions further serve to help align fixtures 110 and 120 during the installation process, and to enable a technician to hold together fixture sections 110 and 120 with one hand, which allows the same technician to fasten together joiner brackets 210 and 230 with the other hand.

Figure 10:
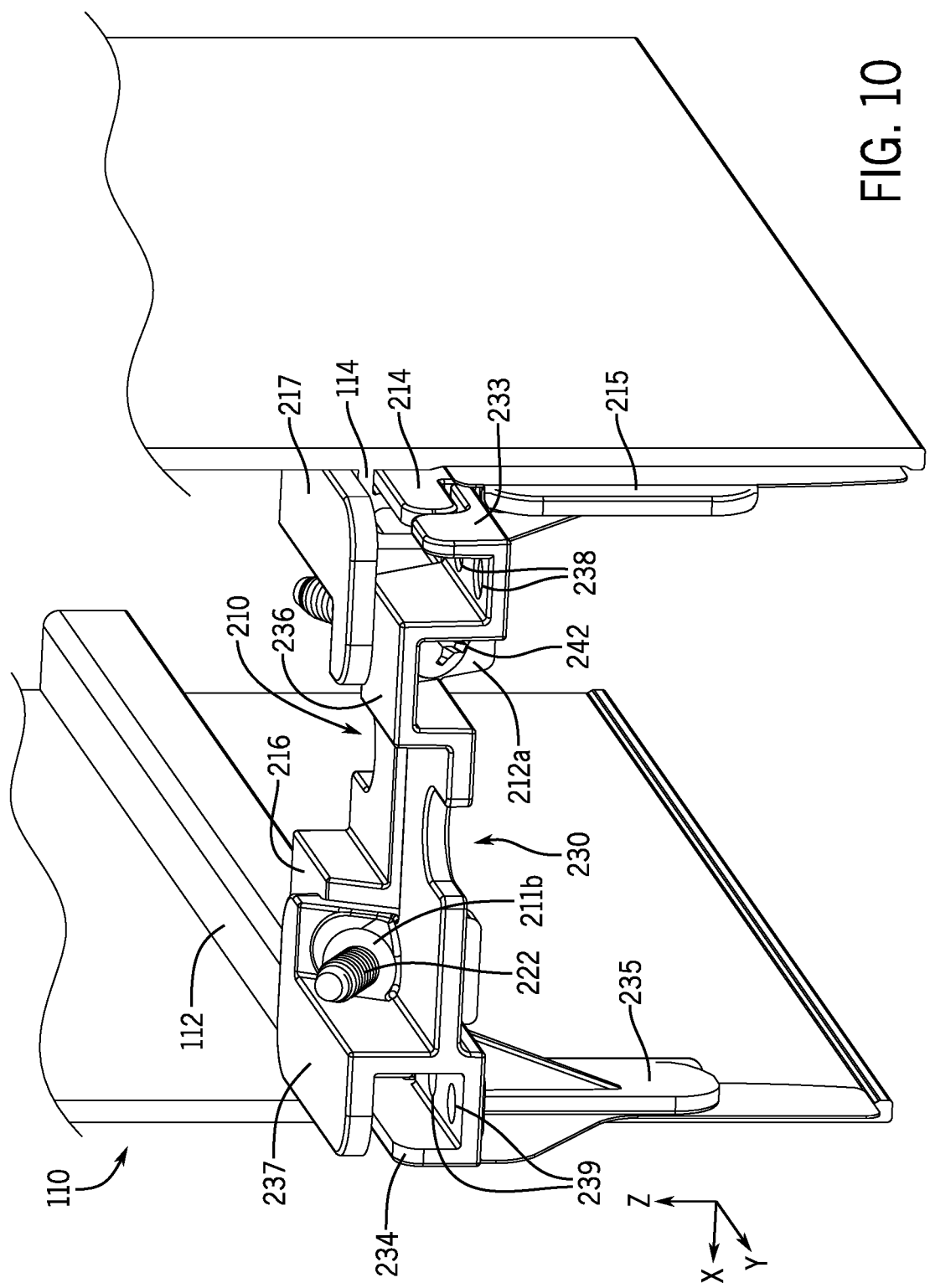
FIG. 10 is a detailed perspective view of a light fixture section showing the example joiner system partially engaged therewithin.

FIG. 10 depicts a detailed perspective view of light fixture section 110 and cross-screw joiner system 200. It should be understood that FIG. 10 does not illustrate any particular stage in an installation procedure, but rather is provided as an additional perspective to illustrate the complementary, interlocking geometries of joiner brackets 210 and 230.

Although FIGS. 1A-10 and their accompanying detailed description show and describe a particular implementation—with extruded aluminum fixture sections having specifically placed rails and channels, a cross-screw or other fastener joiner system with a particular set of dimensions, angles, number of screws, and particular types of fasteners, and other specific details—it will be appreciated by one of ordinary skill that the principles behind the design and construction of cross-screw joiner system 200 may be applied to produce similar alternative designs. For example: the angles with which fasteners 222 and 242 extend through joiner brackets 210 and 230 may be varied; the shape, size, and curvature of flanges 213, 214, 233, and 234 may be adjusted; the size, shape, and location of shelves 216, 217, 236, and 237 may be modified, the size, shape, and thickness of paddles 215 and 235 may be varied; the types of fasteners themselves can be substituted, and/or a variety of other elements may be altered from that shown and described herein, without departing from the scope of the present disclosure. Other "rotationally interlocking" joiner bracket designs may be used, which apply the same invention as shown, described, and contemplated herein. It should be understood that the present disclosure is not limited to the particular embodiment shown in FIGS. 1A-10, and encompasses other designs based on the design techniques disclosed in the present application.

Although certain example methods and apparatus have been described herein, the scope of coverage of this patent is not limited thereto. On the contrary, this patent covers all methods, apparatuses, and articles of manufacture fairly falling within the scope of the appended claims, either literally or under the doctrine of equivalents.

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or as other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

What is claimed is:

1. A lighting fixture system comprising:
   a first fixture section having a first end and a second end opposite the first end, a first sidewall and a second sidewall each extending from the first end to the second end, and a first rail and a second rail positioned along the first and second sidewalls of the first fixture section, respectively;
   a second fixture section having a first end and a second end opposite the first end, a first sidewall and a second sidewall each extending from the first end to the second end, and a first rail and a second rail positioned along the first and second sidewalls of the second fixture section, respectively;
   a first joiner bracket adapted to rigidly couple with the first and second rails of said first fixture section, said first joiner bracket comprising (i) a first bore having a central axis extending therethrough and (ii) a first boss having a central axis extending therethrough;
   a second joiner bracket adapted to rigidly couple with the first and second rails of said second fixture section, said second joiner bracket comprising (i) a second bore having a central axis extending therethrough and (ii) a second boss having a central axis extending therethrough, in which said first and second joiner brackets are configured to interlock with each other such that (a) the central axes of the first bore and the first boss are in substantial alignment and (b) the central axes of the second bore and the second boss are in substantial alignment;
   a first fastener adapted to extend through the first bore and the first boss; and
   a second fastener adapted to extend through the second bore and the second boss, wherein engaging at least one of the first and second fasteners pulls together the first and second joiner brackets to, in turn, join the first and second fixture sections.

2. The lighting fixture system according to claim 1, in which the fasteners are threaded screws and each of the first and second bosses are threaded to engage a respective one of said screws.

3. The lighting fixture system according to claim 1, in which the fasteners are self-tapping screws and each of the first and second bosses have pilot holes that engage a respective one of said screws.

4. The lighting fixture system according to claim 1, in which the first joiner bracket and the second joiner bracket are interchangeable.

5. The lighting fixture system according to claim 1, in which said first joiner bracket further comprises:
   at least one of a vertically extending paddle and a flange adapted to substantially align with the second sidewalls of the first and second fixture sections.

6. The lighting fixture system according to claim 5, further comprising:
   a light shield positioned between said paddle and the second sidewalls of the first and second fixture sections, said light shield being configured to substantially cover an interface between the first and second fixture sections, to preclude the seepage of light between the respective ends of the first and second fixture sections.

7. A joiner system for joining a first fixture section to a second fixture section, said joiner system comprising:
   a first joiner bracket adapted to rigidly couple with the first fixture section, said first joiner bracket comprising (i) a first bore having a central axis extending therethrough and (ii) a first boss having a central axis extending therethrough;
   a second joiner bracket adapted to rigidly couple with the second fixture section, said second joiner bracket comprising (i) a second bore having a central axis extending therethrough and (ii) a second boss having a central axis extending therethrough, in which said first and second joiner brackets are configured to interlock with each other such that (a) the central axes of the first bore and the first boss are in substantial alignment and (b) the central axes of the second bore and the second boss are in substantial alignment;
   a first threaded fastener adapted to extend through the first bore and the first boss; and
   a second threaded fastener adapted to extend through the second bore and the second boss, wherein engaging the first and second threaded fasteners pulls together the first and second joiner brackets.

8. The joiner system according to claim 7, in which the first joiner bracket and the second joiner bracket are identically shaped so as to be operably interchangeable.

9. The joiner system according to claim 7, wherein said first bore is an elongated bore having a major axis that is larger than a diameter of said first threaded fastener.

10. The joiner system according to claim 7, in which said first joiner bracket has a first end and a second end, and in which said first joiner bracket further comprises:
    a vertically extending paddle extending substantially downwardly from the first end of said first joiner bracket.

11. The joiner system according to claim 10, further comprising:
- a light shield positioned in substantial alignment with said paddle, said light shield being adapted for substantially covering an interface between the first and second fixture sections.

12. The joiner system according to claim 7,
- in which said first joiner bracket has a first end and a second end, and wherein said first joiner bracket further comprises:
  - a first shelf positioned proximate the first end, and said first shelf of the first joiner bracket having a lower surface positioned at a first height; and
- in which said second joiner bracket has a first end and a second end, the first ends of the first and second brackets being in alignment, the second ends of the first and second brackets being in alignment, and wherein said second joiner bracket further comprises:
  - a second shelf positioned proximate the first end, said second shelf of the second joiner bracket having an upper surface positioned at a second height, in which the second height is lower than the first height such that said second shelf of the second joiner bracket is positioned at least partially underneath said first shelf of the first joiner bracket.

13. The joiner system according to claim 12,
- in which said first joiner bracket further comprises:
  - a second shelf positioned proximate the second end, and said second shelf of the first joiner bracket having an upper surface positioned at the second height; and
- in which said second joiner bracket further comprises:
  - a first shelf positioned proximate the second end, said first shelf of the second joiner bracket having a lower surface positioned at the first height, in which the second height is lower than the first height such that said first shelf of the second joiner bracket is positioned at least partially underneath said second shelf of the first joiner bracket.

14. A joiner bracket used in a joining system for joining a first fixture to a second fixture, said joiner bracket having a first end, a second end, and a centerline halfway between the first and second ends, the joiner bracket comprising:
- a first vertical flange at said first end adapted for slidable positioning through a first channel of said first fixture;
- a first shelf extending over and above at least a portion of said first vertical flange, said first shelf being positioned proximate the first end, said first shelf being adapted for slidable positioning over the first channel of said first fixture, and said first shelf having a lower surface positioned at a first height;
- a coupling boss positioned proximate the first side having a central axis extending therethrough at a first angle relative to the first shelf;
- a second vertical flange at said second end adapted for slidable positioning through a second channel of said first fixture;
- a second shelf adjacent to said second vertical flange and positioned proximate to the second end, said second shelf having an upper surface positioned at a second height, in which the second height is less than the first height; and
- an angled bore hole positioned proximate the second end having a central axis extending therethrough at a second angle relative to the second shelf, wherein the first angle and the second angle are congruent.

15. The joiner bracket according to claim 14, further comprising:
- a vertically extending paddle extending substantially downwardly from first vertical flange, said first vertical flange and said paddle having outer walls proximate to the first end that are substantially parallel to each other.

16. The joiner bracket according to claim 14, further comprising:
- a first bridge extending between said first flange and said first shelf, said first bridge having formed therethrough one or more holes adapted to receive one or more respective fasteners.

17. The joiner bracket according to claim 14, further comprising:
- a second bridge extending between said second flange and said second shelf, said second bridge having formed therethrough one or more holes adapted to receive one or more respective fasteners.

* * * * *